(12) United States Patent
Miyasaka et al.

(10) Patent No.: US 9,946,140 B2
(45) Date of Patent: Apr. 17, 2018

(54) PROJECTOR CAPABLE OF PROJECTION IN DIFFERENT POSITIONS IN THE DEPTH DIRECTION

(71) Applicant: SEIKO EPSON CORPORATION, Tokyo (JP)

(72) Inventors: Koichi Miyasaka, Matsumoto (JP); Takashi Endo, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/122,358

(22) PCT Filed: Mar. 17, 2015

(86) PCT No.: PCT/JP2015/001484
§ 371 (c)(1),
(2) Date: Aug. 29, 2016

(87) PCT Pub. No.: WO2015/146073
PCT Pub. Date: Jan. 10, 2015

(65) Prior Publication Data
US 2016/0373702 A1    Dec. 22, 2016

(30) Foreign Application Priority Data
Mar. 26, 2014 (JP) ................. 2014-063249

(51) Int. Cl.
*G03B 21/14* (2006.01)
*G03B 21/00* (2006.01)
(Continued)

(52) U.S. Cl.
CPC ........... *G03B 21/005* (2013.01); *G03B 21/14* (2013.01); *G03B 21/147* (2013.01); *H04N 9/317* (2013.01);
(Continued)

(58) Field of Classification Search
CPC .... G03B 21/005; G03B 21/14; G03B 21/147; G03B 21/2033; G03B 21/606; H04N 9/3161; H04N 9/317
See application file for complete search history.

(56) References Cited

U.S. PATENT DOCUMENTS 5,973,840 A    10/1999  Itoh et al.
6,109,751 A     8/2000  Hashizume et al.
(Continued)

FOREIGN PATENT DOCUMENTS

JP        4752031 B2      8/2011
KR    1999-0076930 A     10/1999
(Continued)

OTHER PUBLICATIONS

Jun. 16, 2015 International Search Report issued in International Patent Application No. PCT/JP2015/001484.
(Continued)

*Primary Examiner* — Sultan Chowdhury
*Assistant Examiner* — Magda Cruz
(74) *Attorney, Agent, or Firm* — Oliff PLC

(57) ABSTRACT

A projector capable of simultaneous or concurrent projection in different positions in the depth direction. The projector includes a plurality of display sections each of which forms a collimated image light ray, a superimposing optical system that superimposes the image light rays having exited out of the plurality of display sections on one another with the image light rays unfocused, a projection optical system that projects an image corresponding to the image light rays superimposed by the superimposing optical system, and a circuit apparatus that causes the image light rays to exit out of local image source areas set in the plurality of display sections to shift a position where the image light rays are superimposed on one another to a plurality of superimposi- (Continued)

tion positions different from one another along an optical axis.

12 Claims, 11 Drawing Sheets

(51) Int. Cl.
    *H04N 9/31* (2006.01)
    *G03B 21/606* (2014.01)
    *G03B 21/20* (2006.01)

(52) U.S. Cl.
    CPC ....... *H04N 9/3161* (2013.01); *G03B 21/2033* (2013.01); *G03B 21/606* (2013.01)

(56) References Cited

U.S. PATENT DOCUMENTS

| | | | |
|---|---|---|---|
| 6,545,653 B1* | 4/2003 | Takahara | ............ G02F 1/1334 345/100 |
| RE38,225 E | 8/2003 | Itoh et al. | |
| 7,936,392 B2 | 5/2011 | Ng et al. | |
| 2005/0195374 A1 | 9/2005 | Akiyama | |
| 2011/0157667 A1* | 6/2011 | Lacoste | ............... G02B 27/2271 359/9 |
| 2014/0146290 A1 | 5/2014 | Sieler et al. | |
| 2015/0085259 A1 | 3/2015 | Schreiber et al. | |

FOREIGN PATENT DOCUMENTS

| | | |
|---|---|---|
| KR | 2006-0043467 A | 5/2006 |
| KR | 2011-0028827 A | 3/2011 |
| WO | 2012/156280 A1 | 11/2012 |
| WO | 2013/144311 A1 | 10/2013 |

OTHER PUBLICATIONS

Sieler et al., "Microlens array based LCD projection display with software-only focal distance control," Proceedings vol. 9025IS&T/SPIE Electronic Imaging, vol. 8643, 2013, pp. 86430B-1-86430B-8.

* cited by examiner

PROJECTOR CAPABLE OF PROJECTION IN DIFFERENT POSITIONS IN THE DEPTH DIRECTION

The entire disclosure of Japanese Patent Application No. 2014-063249, filed Mar. 26, 2014 is expressly incorporated by reference herein.

TECHNICAL FIELD

The present invention relates to a projector capable of projection in different positions in the depth direction

BACKGROUND ART

In a projector of related art, since a projection optical system that enlarges and projects an image on a planar display element is used, a plane where focus is achieved is a substantially flat plane, and allowed adjustment is only shifting the position of the plane forward or rearward. That is, simultaneous or concurrent projection in spaces having different depth ranges is not allowed, and there has been no projector capable, for example, of performing projection on a curved screen with focus maintained over the surface or coping with a change in the shape of the curved screen.

Meanwhile, there is a technology that allows an imaging apparatus to acquire information on the direction of light incident on a two-dimensional sensor and simultaneously capture images of subjects separate from each other in the depth direction (PTL 1).

CITATION LIST

Patent Literature

PTL 1: U.S. Pat. No. 7,936,392

SUMMARY OF INVENTION

The invention has been made in view of the circumstance described above, and an object of the invention is to provide a projector capable of simultaneous or concurrent projection in different positions in the depth direction.

In order to achieve the object described above, a projector according to the invention includes a plurality of display sections each of which forms a collimated image light ray, a superimposing optical system that superimposes the image light rays having exited out of the plurality of display sections on one another with the image light rays unfocused, a projection optical system that projects an image corresponding to the image light rays superimposed by the superimposing optical system, and a display controller that causes the image light rays to exit out of local image source areas set in the plurality of display sections to set a position where the image light rays are superimposed on one another to a plurality of superimposition positions different from one another along an optical axis.

In the projector described above, the projection optical system projects an image superimposed by the superimposing optical system, and the display controller sets the position where the image light rays are superimposed on one another to a plurality of superimposition positions different from one another along the optical axis, whereby simultaneous or concurrent projection in spaces having different depth ranges can be performed through the projection optical system. Further, in the projection optical system, the position where the image light rays are superimposed on one another is conjugate with a projection receiving position, and adjustment of the superimposition position allows adjustment of the projection receiving position along the optical axis.

In a specific aspect of the invention, in the projector described above, the superimposing optical system includes a plurality of lens elements facing the plurality of display sections and a superimposing lens that superimposes the image light rays having passed through the plurality of lens elements on one another in such a way that the image light rays are concentrated. In this case, each of the lens elements can adjust the degree of convergence of the image light ray from the corresponding display section, whereby the superimposing lens can superimpose the image light rays from the plurality of display sections on one another in such a way that the image light rays are concentrated.

In another specific aspect of the invention, in each of the display sections, the center of the image source area is set in a position shifted from a standard position that is a reference in accordance with a relative arrangement of the display section and the setting of the superimposition position. In this case, the superimposition position can be relatively readily set by shifting the center of each of the image source areas.

In still another specific aspect of the invention, in each of the display sections, the amount of shift of the center of the image source area from the standard position is roughly proportional to the distance from a center through which the optical axis of the superimposing optical system passes to the center of the display section. In this case, the image light rays from the display sections are allowed to be concentrated precisely at a single location.

In still another specific aspect of the invention, a plurality of images to be displayed in the plurality of display sections are each a basic image deformed in accordance with the deviation from the center. As a result, an image formed in the superimposition position can be a sharp image with a small amount of blur.

In still another specific aspect of the invention, in each of the display sections, when the center of the image source area coincides with the standard position, the superimposition position is conjugate with the display section with respect to the superimposing optical system.

In still another specific aspect of the invention, the plurality of display sections correspond to a plurality of portions formed in a single display element or a plurality of display elements.

In still another specific aspect of the invention, the plurality of display sections have transmissive display elements and an illuminator that illuminates the display elements. In this case, the compact display sections allow formation of a bright image and projection of the bright image.

In still another specific aspect of the invention, the illuminator includes a surface-emitting laser. In this case, the compact illuminator can output collimated illumination light, and the transmissive display elements therefore readily allow collimated image light rays to exit.

In still another specific aspect of the invention, the plurality of display sections have a light ray selection section that includes a pair of lens arrays and a pinhole array sandwiched therebetween and selectively transmit image light rays parallelized by the light ray selection section. In this case, the image light rays can be more precisely collimated.

In still another specific aspect of the invention, the display controller changes the superimposition position in a time division manner to allow the projection optical system to perform projection in projection positions over a three-dimensional range. In this case, an image can be projected on a surface having a stereoscopic shape.

In still another specific aspect of the invention, the display controller causes the plurality of display sections to display motion images in the image source areas.

DESCRIPTION OF EMBODIMENTS

First Embodiment

Figure 1:
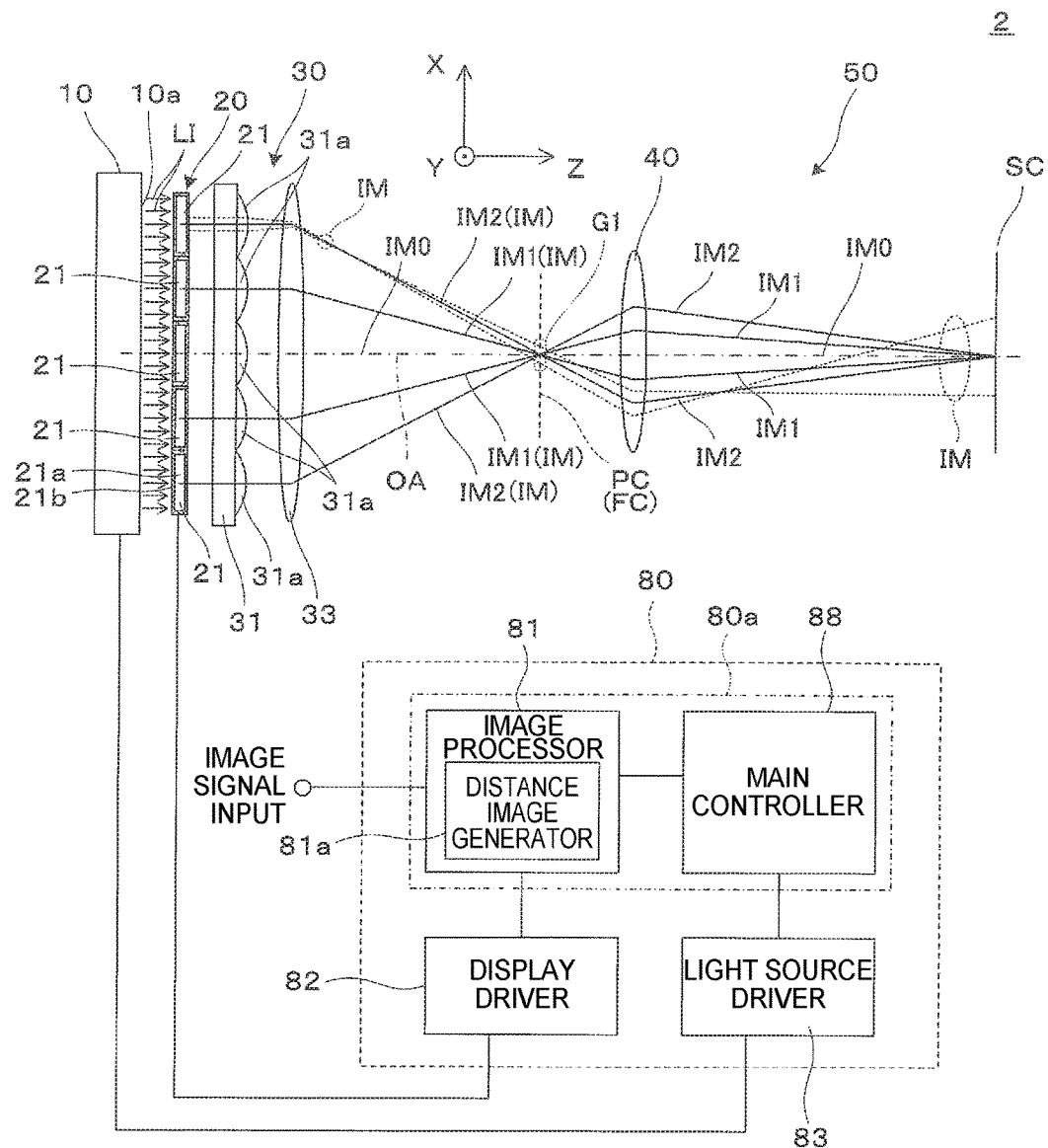
FIG. 1 is a view for describing the structure of a projector according to a first embodiment.

A projector 2 according to a first embodiment of the invention includes an optical system unit 50, which projects image light, and a circuit apparatus 80, which controls the operation of the optical system unit 50, as shown in FIG. 1.

The optical system unit 50 includes an illuminator 10, a display device 20, a superimposing optical system 30, and a projection optical system 40.

In the optical system unit 50, the illuminator 10 outputs precisely collimated illumination light LI through an output surface 10a, which is parallel to an XY plane perpendicular to an optical axis OA. In this case, the illumination light LI is outputted in a Z direction, which is parallel to the optical axis OA, as a whole and as an optical element. The illuminator 10 includes a surface-emitting laser as a light source. The surface-emitting laser is formed of laser devices that emit three or more color light beams including RGB light beams and are two-dimensionally arranged, for example, at intervals of several μm, and the illumination light LI outputted through the output surface 10a is uniformly distributed in the XY plane.

Figure 2A:
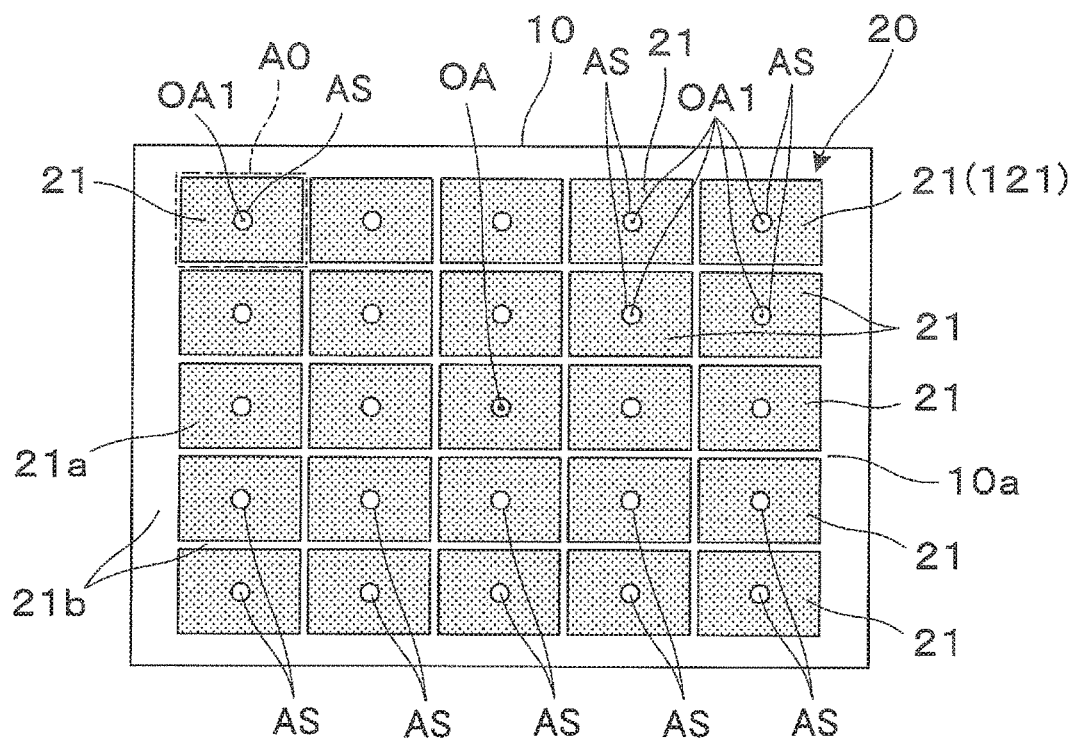
FIG. 2 is a view for describing image source areas formed in display sections.

The display device 20 is a component having a plurality of display sections 21 two-dimensionally arranged in parallel to the XY plane, as shown in FIG. 2(A). In the example shown in FIG. 2(A), the display device 20 has a large number of display sections 21 arranged in a matrix of 5 rows and 5 columns with no gap therebetween. Each of the display sections 21 has a liquid crystal panel 21a and a light blocking frame 21b. The liquid crystal panel 21a is a transmissive light modulator in which a liquid crystal material is sandwiched between a pair of light transmissive substrates, and the liquid crystal panel 21a is accompanied by polarizing filters that are not shown but are disposed at the light incident and exiting surfaces. The liquid crystal panel 21a has a large number of pixels that allow two-dimensional image display and includes color filters on a pixel basis. The liquid crystal panel 21a does not perform display operation over an entire display area A0 but performs display operation only in a local image source area AS of the entire display area A0. Each of the image source areas AS has a circular shape in the example shown in FIG. 2(A) for ease of illustration but can have an arbitrary shape including a rectangular shape and other polygonal shapes.

The image source area AS is set in each of the display sections 21, which are two-dimensionally arranged. In a basic display mode, each of the image source areas AS is disposed at the center of the entire display area A0, which is a standard position on a divided optical axis OA1, as shown in FIG. 2(A). That is, the center of each of the display sections 21 coincides with the divided optical axis OA1, and the center of each of the image source areas AS also coincides with the divided optical axis OA1. In another display mode (in a case where projection is performed in a closer position), as will be described later in detail, each of the image source areas AS is disposed in a position that deviates from the position of the divided optical axis OA1 so that the image source area AS shifts off the optical axis OA in accordance with the distance between the divided optical axis OA1 and the optical axis OA, as shown in FIG. 3(B). In still another display mode (in a case where projection is performed in a more distant position), each of the image source areas AS is disposed in a position that deviates from the divided optical axis OA1 so that the image source area AS approaches the optical axis OA in accordance with the distance between the divided optical axis OA1 and the optical axis OA, as shown in FIG. 4(B).

Referring back to FIG. 1, the superimposing optical system 30 includes a lens array 31, which has a plurality of lens elements 31a facing the plurality of display sections 21, and a superimposing lens 33, which causes image light rays IM having passed through the plurality of lens elements 31a to concentrate at a point on the optical axis OA so that the image light rays IM are superimposed on one another.

Figure 2B:
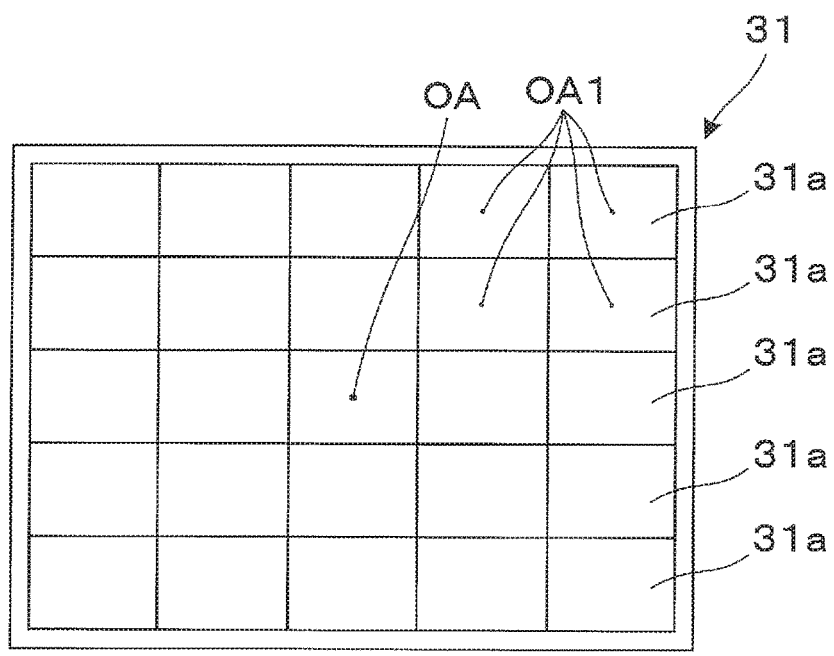

Each of the lens elements 31a, which form the lens array 31, is a convex lens having a contour shape that is substantially the same as the contour of the corresponding display section 21 of the display device 20, as shown in FIG. 2(B). The lens elements 31a have substantially the same power and are so aligned with the display sections 21 and arranged that the lens elements 31a and the display sections 21 share the same divided optical axes OA1. The superimposing lens 33 superimposes the image light rays IM having passed through the plurality of lens elements 31a in such a way that the image light rays IM are concentrated at the same location on the optical axis OA. The superimposing lens 33 deflects the image light rays IM from the lens elements 31a in such a way that an image light ray IM separate farther away from the optical axis OA (image light ray IM2, for example) is deflected by a greater amount. The position where the image light rays IM intersect the optical axis OA is a conjugate position PC, which is conjugate with the display sections 21 with respect to the superimposing optical system 30. In the example shown in FIG. 1, image light rays IM0, IM1, and IM2 from the corresponding display sections 21 are incident on the conjugate position PC and superimposed on one another. The plane in the conjugate position PC is a projection front focal plane FC set on the upstream side or in a position upstream of the projection optical system 40, and a relatively bright small image G1 is formed in the projection front focal plane FC. The small image G1 spreads in the XY plane and has a two-dimensional optical intensity distribution. The image light rays IM0, IM1, and IM2 are concentrated on the optical axis OA in the conjugate position PC or the projection front focal plane FC but are not focused or convergent to a single point.

The projection optical system 40 shown in FIG. 1 is an enlarging projection lens having a fixed focal length and enlarges and projects the small image G1, which has been formed by the image light rays IM superimposed on one another by the superimposing optical system 30, on a screen SC.

Figure 3A:
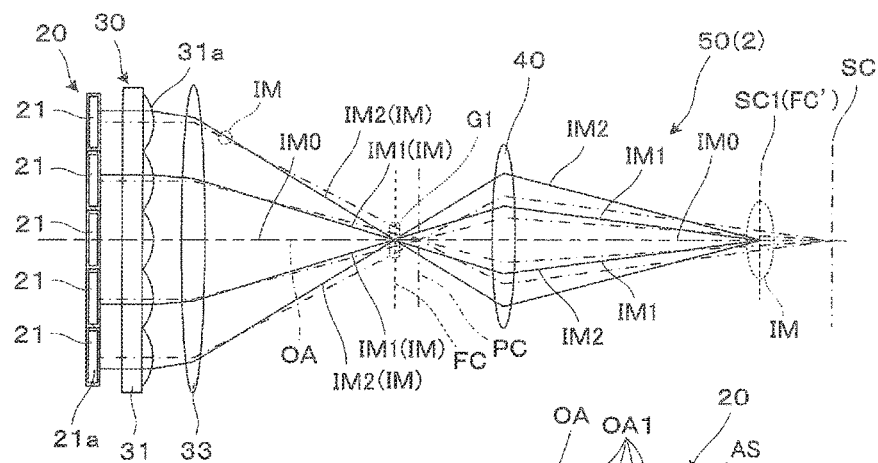
FIG. 3 is a view for describing a state in which projection is performed in a position closer to the projector than a standard position.
Figure 3B:
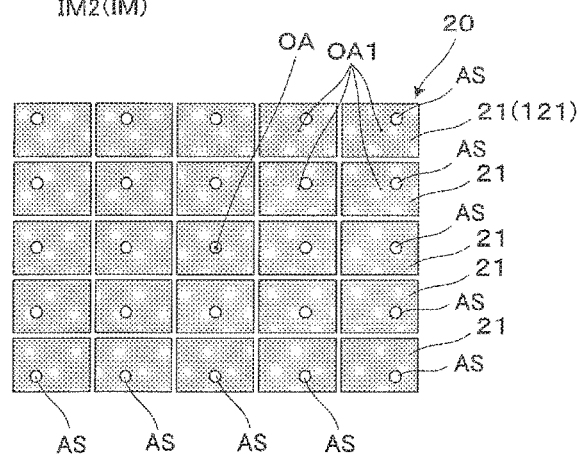
Figures 4A, 4B:
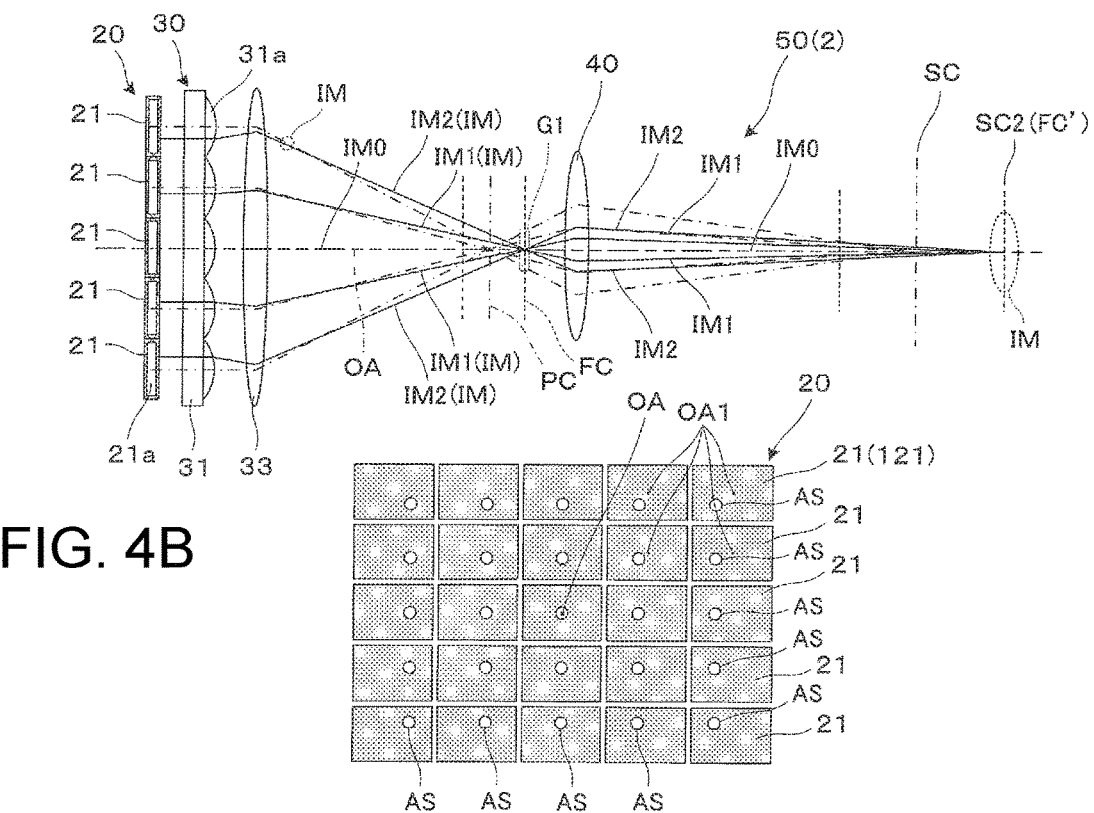
FIG. 4 is a view for describing a state in which projection is performed in a position more distant to the projector than the standard position.

FIG. 3(A) shows a case where an image is projected on a screen SC1 or a projection receiving object disposed in a position relatively close to the projector 2, and FIG. 3(B) shows the image source areas AS set in the display sections 21 or the liquid crystal panels 21a. In the close-range projection, the image source areas AS in the liquid crystal panels 21a arranged in a matrix are so disposed that the image source area AS in a liquid crystal panel 21a closer to the periphery is shifted outward by a greater amount, as shown in FIG. 3(B). More specifically, each of the image source areas AS is shifted away from the optical axis OA with reference to the standard position corresponding to the divided optical axis OA1 shown in FIG. 2(A). Further, the amount of shift described above depends on the relative position of the liquid crystal panel 21a and increases in proportion to the distance from the optical axis OA to the liquid crystal panel 21a. As a result, since the image light rays IM0, IM1, and IM2 intersect the optical axis OA in a position upstream of the conjugate position PC, they intersect the optical axis OA also in a position upstream of the screen SC after having passed through the projection optical system 40, and the plane at the intersection is a projection rear focal plane FC' or the screen SC1 set on the downstream side or in a position downstream of the projection optical system 40, as shown in FIG. 3(A).

FIG. 4(A) shows a case where an image is projected on a screen SC2 or a projection receiving object disposed in a position relatively distant from the projector 2, and FIG. 4(B) shows the image source areas AS set in the display sections 21 or the liquid crystal panels 21a. In the distant-range projection, the image source areas AS in the liquid crystal panels 21a arranged in a matrix are so disposed that the image source area AS in a liquid crystal panel 21a closer to the periphery is shifted inward by a greater amount, as shown in FIG. 4(B). More specifically, each of the image source areas AS is shifted toward the optical axis OA with reference to the standard position corresponding to the divided optical axis OA1 shown in FIG. 2(A). Further, the amount of shift described above increases in proportion to the distance from the optical axis OA to the liquid crystal panel 21a. As a result, since the image light rays IM0, IM1, and IM2 intersect the optical axis OA in a position downstream of the conjugate position PC, they intersect the optical axis OA also in a position downstream of the screen SC after having passed through the projection optical system 40, and the plane at the intersection is the projection rear focal plane FC' or the screen SC2, as shown in FIG. 4(A).

As described above, adjusting the arrangement of the image source areas AS set in the liquid crystal panels 21a allows not only formation of image light rays IM each having an optical intensity distribution but also control of the exiting angle of each of the image light rays IM. The small image G1 having desired luminance and color distributions can therefore be formed in a desired position upstream or downstream of the conjugate position PC along the optical axis OA. The position where the small image G1 is formed corresponds to the position where the image light rays IM0, IM1, and IM2 are superimposed on one another, and the projection front focal plane FC is present in the position. When the position of the projection front focal plane (superimposition position) FC is changed to a position upstream or downstream of the conjugate position PC, the two-dimensional arrangement pattern of the image source areas AS set in the plurality of liquid crystal panels 21a arranged in a matrix is changed to a lattice-point-like pattern enlarged or reduced in a mathematically similar manner with reference to the lattice-point-like arrangement corresponding to the standard positions shown in FIG. 2(B) in such a way that the center of the pattern, through which the optical axis OA passes, remains unchanged.

Figure 5A:
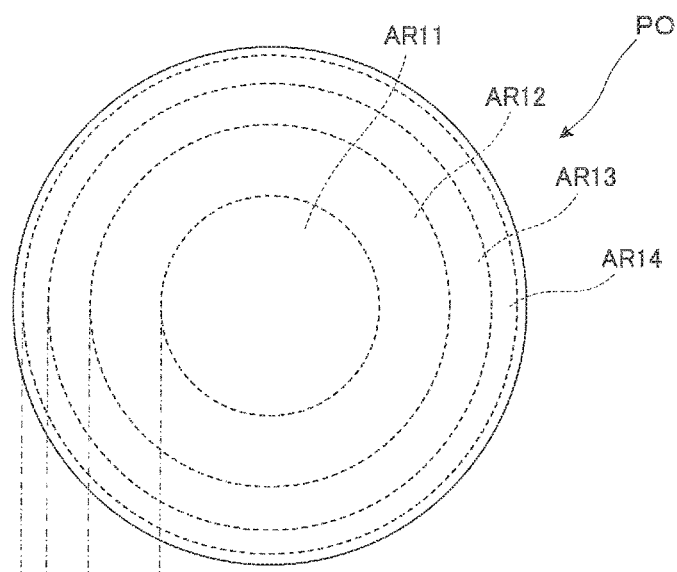
FIGS. 5(A) to 5(C) are views for describing an application example of projection.
Figure 5B:
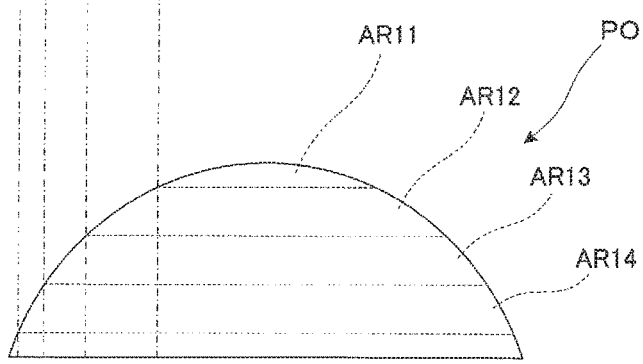
Figure 5C:
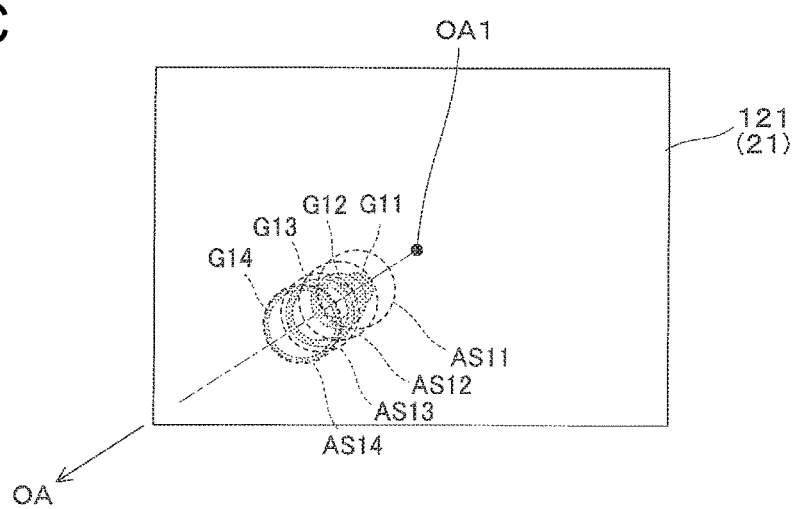

FIGS. 5(A) and 5(B) are a front view and a side view showing an example of the projection receiving object, and FIG. 5(C) describes a specific example of the image source area AS set in one of the liquid crystal panels 21a.

A projection receiving object PO shown in FIGS. 5(A) and 5(B) has a hemispherical shape, and the center thereof protrudes toward the projector 2. A description will be made of a case where the surface of the projection receiving object PO is divided into areas AR11, AR12, AR13, and AR14 sandwiched between contours based on the distance from the projector 2. An image is projected over each of the areas AR11 to AR14 assuming that they are equidistant areas.

A display section 121 shown in FIG. 5(C) corresponds to an upper-right-corner display section 21 among the display sections 21 that form the display device 20 in FIG. 2(A). In this display section 121, an image to be projected in the closest-range area AR11 in FIG. 5(A) is formed in a circular image range G11 corresponding to the contour of the area AR11 in an image source area AS11, which is relatively close to the divided optical axis OA1. An image to be projected in the relatively-close-range area AR12 in FIG. 5(A) is formed in an annular image range G12 corresponding to the contour of the area AR12 in an image source area AS12, which is an image source area AS that is second closest to the divided optical axis OA1. An image to be projected in the relatively-distant-range area AR13 in FIG. 5(A) is formed in an annular image range G13 corresponding to the contour of the area AR13 in an image source area AS13, which is distant from the divided optical axis A1. An image to be projected in the most-distant-range area AR14 in FIG. 5(A) is formed in an annular image range G14 corresponding to the contour of the area AR14 in an image source area AS14, which is relatively distant from the divided optical axis OA1. The images displayed in the image source areas AS11 to AS14 can be images having been corrected in consideration of inclination and curvature of the areas AR11 to AR14.

A description has been made of the display operation of the upper-right-corner display section 121, and the other display sections 21 perform display operation similar to that of the display section 121 except that the image source areas AS11 to AS14 are located in different positions in the liquid crystal panel 21a. It is, however, noted that the contours of the image ranges G11 to G14 and images displayed therein slightly differ from those in different display sections 21.

A description will be made of shift of the focal position or the focus position of the projector 2 and the arrangement and display action of the image source areas AS set in the display sections 21 to achieve shift of the focal position with reference to FIGS. 6(A) to 6(C).

Figure 6A:
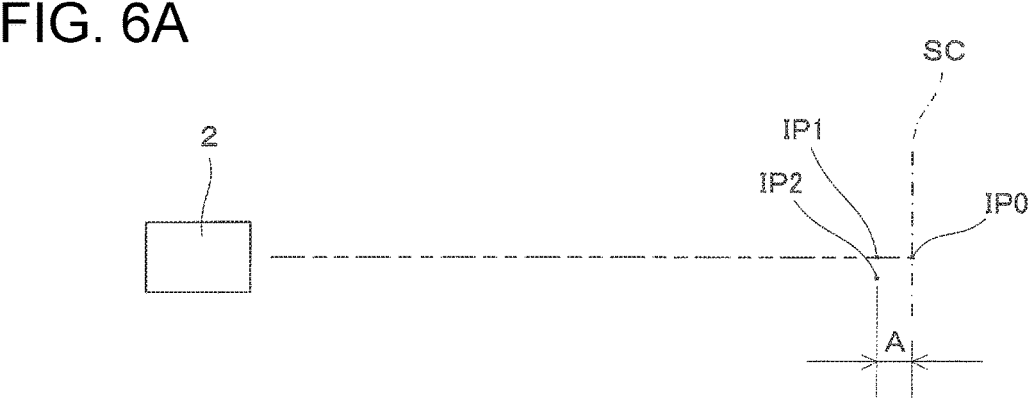
FIGS. 6(A) to 6(C) are views for describing projection states.

Consider a case where a virtual screen SC located in a basic position is provided and focus is achieved at a specific point IP0 on the screen SC (case 1) and a case where focus is achieved in a position upstream of the screen SC in the basic position by a distance A (case 2), as shown in FIG. 6(A). In the case 2, where focus is achieved in a position upstream of the screen SC, consider the following two points as the location where an image is displayed: a first point IP1 on the optical axis OA; and a second point IP2, which deviates from the optical axis OA in the vertical direction.

Figure 6B:
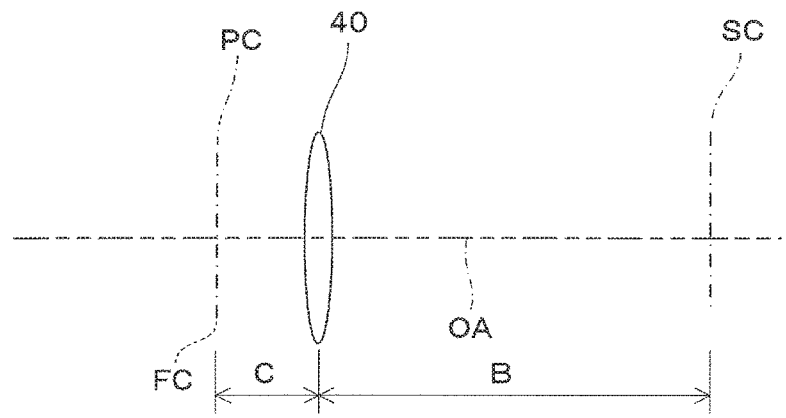

As conceptually shown in FIG. 6(B), let C be the distance from the projection optical system 40 to the conjugate position PC, and F_pj be the focal length of the projection optical system 40, the following relationship is satisfied based on a general lens expression.

$$1/C + 1/B = 1/F\_pj$$

Figure 6C:
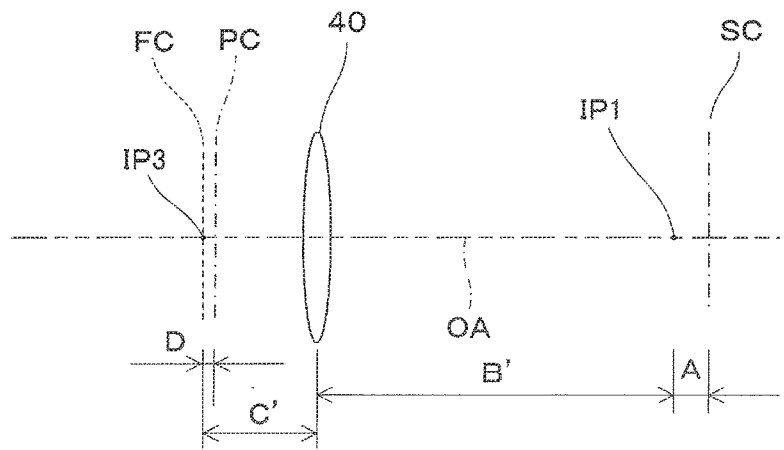

As conceptually shown in FIG. 6(C), in a case where the display device 20 itself shifts the focus from the screen SC forward by the distance A, let B' be the distance between the first point IP1 and the projection optical system 40, and C' be the distance between the projection optical system 40 and an intersection IP3 corresponding to the first point IP1, the following relationship is satisfied based on the general lens expression.

$$1/C' + 1/B' = 1/F\_pj$$

That is, to shift the focus forward from the screen position by the distance A, the following expression is satisfied, and the distance D from the conjugate position PC to the target projection front focal plane FC or the intersection IP3 can be determined based on the focal length F_pj of the projection optical system 40, the distance A, and other parameters.

$$1/(C+D) + 1/(B-A) = 1/F\_pj$$

The distance D corresponds to the amount of focus shift of an intermediate image formed in a position upstream of the projection optical system 40 (corresponding to the small image G1 shown in FIG. 1). That is, adjustment operation of changing the amount of focus shift of the intermediate image in a position upstream or downstream of the conjugate position PC allows adjustment of the focus position of an image projected by the projection optical system 40 to a position upstream or downstream of the basic position. Specifically, the image formation position can be shifted from the specific point (projected position) IP0 on the screen SC to the first point (projected position) IP1.

Figure 7A:
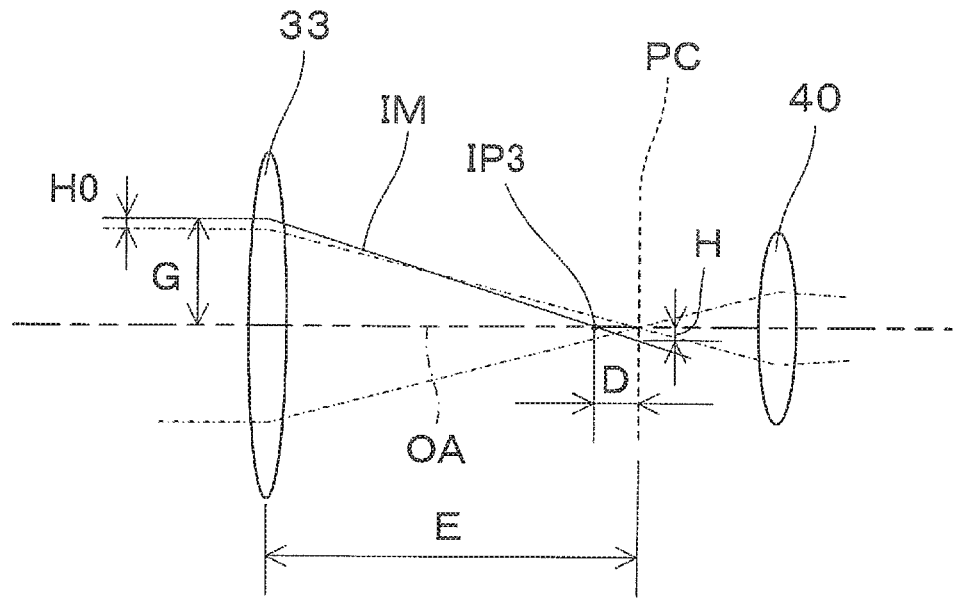
FIGS. 7(A) and 7(B) are views for describing projection states.

Consider a condition under which the position of the intermediate image or the small image G1 shown in FIG. 1 (superimposition position or focus position) is changed on the the side of lens 33, specifically, a condition under which an image (center image) is formed at the intersection IP3 described above on the optical axis OA, with reference to FIG. 7(A). The intersection IP3 is conjugate with the first point IP1 shown in FIG. 6(A) with respect to the projection optical system 40. First, let E be the distance between the superimposing lens 33 and the conjugate position PC, and consider an image light ray IM that exits out of a specific liquid crystal panel 21a of the display device 20 toward the intersection IP3. To allow the image light ray IM to be incident not on the conjugate position PC but on the intersection IP3, which is upstream of the conjugate position PC, the exit position of the image light ray IM is shifted from the standard position on the divided optical axis OA1 in a direction away from the optical axis OA. Let G be the amount of deviation in this case by which the exit position of the image light ray IM deviates from the optical axis OA, which is a general reference. The amount of deviation of the exit position of the image light ray IM in the liquid crystal panel 21a in accordance with the change in the focus position or the superimposition position corresponds to the amount of deviation of the image light ray IM from the optical axis OA in the conjugate position PC. The amount of deviation H in the conjugate position PC that corresponds to the amount of deviation H0, by which the exit position of the image light ray IM is shifted from the divided optical axis OA1 in the liquid crystal panel 21a, is determined as follows.

$$H : D = G : (E - D)$$

$$H = D \times G / (E - D) \quad (1)$$

That is, in the case of the image at the intersection IP3 (center image), the amount of deviation H or the amount of deviation H0 increases in proportion to the distance G from the optical axis OA to the exit position of the image light ray IM.

Figure 7B:
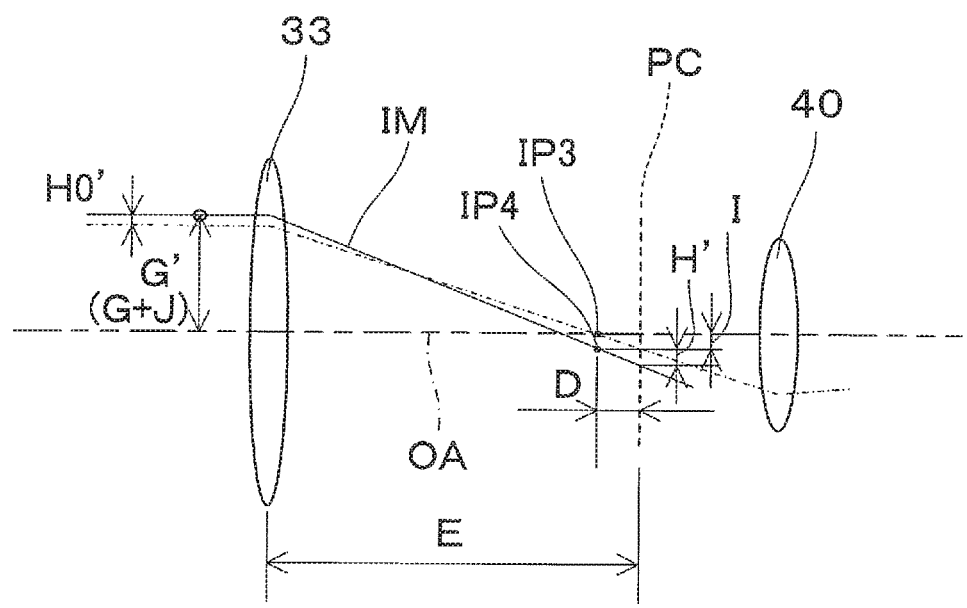

A description will then be made of a condition under which an image is formed at an off-axis point IP4 (peripheral image), which deviates from the intersection IP3 in the direction perpendicular to the optical axis OA, with reference to FIG. 7(B). The off-axis point IP4 corresponds to the second point IP2 in FIG. 6(A). In this case, the amount of deviation of the image light ray IM from the optical axis OA in the conjugate position PC is the sum of the distance I from the optical axis OA to the off-axis point IP4 and the amount of deviation H' resulting from the angle of the image light ray IM. It is, however, noted that in the case of the off-axis point IP4, the determination of the amount of deviation of the exit position of the image light ray IM from the original position before the change in the focus position or the superimposition position in the liquid crystal panel 21a only needs to be made based on the amount of deviation H'. Let G' be the amount of deviation of the exit position from the optical axis OA of the image light ray IM from the optical axis OA, and J be the amount of deviation added because the image under question is a peripheral image, the amount of deviation H' in the conjugate position PC that corresponds to the amount of deviation H0', by which the exit position of the image light ray IM is shifted from the original position in the liquid crystal panel 21a, is therefore determined as follows.

$$E - D : G' + I = D : H'$$

$$H' = D \times (G' + I) / (E - D) \quad (2)$$

$$= D \times (G + I + J) / (E - D) \quad (3)$$

That is, the amount of deviation H' corresponding to the off-axis point IP4, which deviates from the optical axis OA, in the conjugate position PC slightly differs from the amount of deviation H corresponding to the intersection IP3 on the optical axis OA, and the amount of deviation H0 and the amount of deviation H0' also slightly differ from each other.

The above discussion shows that the amount of image position deviation H0 set in the liquid crystal panel 21a to form an image at the intersection IP3 on the optical axis OA and the amount of image position deviation H0' set in the liquid crystal panel 21a to form an image at the off-axis point IP4, which deviates from the optical axis OA, need to differ from each other in accordance with the position of the intermediate image or the small image G1 shown in FIG. 1.

That is, images displayed in the image source area AS in each of the liquid crystal panels 21a before and after a change in the focus position (superimposition position) slightly differ from each other. As a result, an image displayed in the image source area AS in each of the liquid crystal panels 21a is a basic image deformed or distorted in advance in consideration of deformation in accordance with the focus position (superimposition position). Further, an image displayed in the image source area AS in each of the liquid crystal panels 21a needs to undergo deformation, shift, and other changes in accordance with the degree of deviation of the liquid crystal panel 21a from the optical axis OA.

In an actual projector, the behavior of an image light ray IM is checked in advance in a simulation, and the calculation described above is therefore not always required. The amount of deformation and the amount of shift between images displayed in the image source area AS in each of the liquid crystal panels 21a before and after a change in the focus position can be stored in the form of a conversion data table, and simple image conversion allows generation of a sharp, distortion-free image according to the focus position, which can then be projected on a target object or a projection receiving object.

Referring back to FIG. 1, the circuit apparatus 80 includes an image processor 81, to which image data is externally inputted, a display driver 82, which drives the display device 20 provided in the optical system unit 50 based on an output from the image processor 81, and a main controller 88, which oversees and controls the operation of the image processor 81 and the display driver 82. The image processor 81 and the main controller 88 function as a display controller 80a, which controls the operation of the display device 20.

The image processor 81 forms an image signal that operates each of the liquid crystal panels 21a, which form the display device 20, based on the external image data. The external image data can contain, for example, an image content for each projection distance from the projector 2. In this case, to perform projection according to the shape of the surface of a projection receiving object, information on images to be projected in areas separate from the projector 2 by a plurality of stepwise projection distances (distance zones) is read to produce signals carrying images to be formed in each of the liquid crystal panels 21a. Specifically, the image processor 81 can calculate the image source area AS to be set in the each of the liquid crystal panels 21a in such a way that a focused state is achieved in an area separate from the projector 2 by a target projection distance (distance zone). After the image processor 81 calculates an image to be displayed in the image source area AS in each of the liquid crystal panels 21a, the projector 2 can superimpose the images formed in the image source areas AS in the liquid crystal panels 21a on one another in the target projection distance area with no deviation between the images to project a bright, sharp image. An image formed in each of the image source areas AS is not congruent with a basic image as described above, but the basic image is deformed in accordance with the deviation in the position of the liquid crystal panel 21a from the center of the display device 20, through which the optical axis OA passes, the magnitude of change in the focus position, and other factors. The image processor 81 deforms or corrects the image in accordance with the position of the liquid crystal panel 21a and the change in the focus position.

The display driver 82 can operate each of the liquid crystal panels 21a, which form the display device 20, based on each of the image signals outputted from the image processor 81 to form a corresponding image in the liquid crystal panel 21a.

Figure 8:
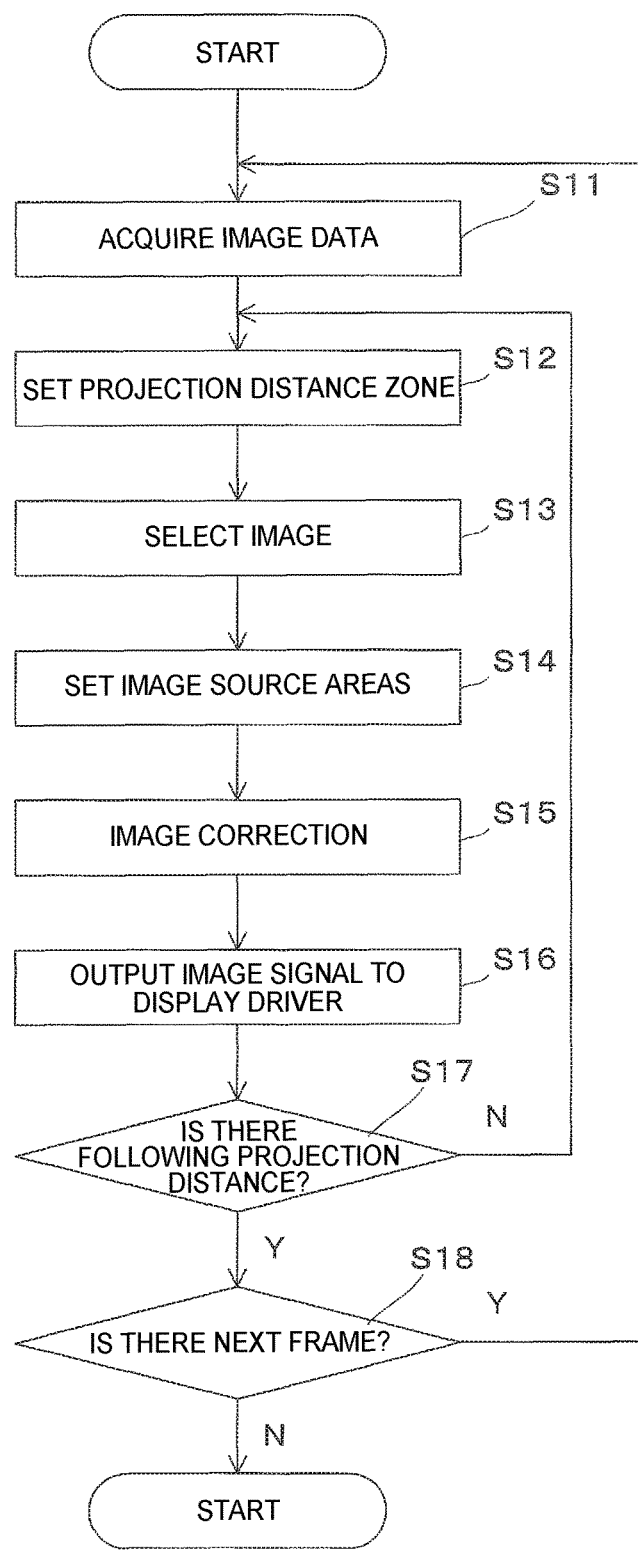
FIG. 8 is a flowchart for describing a summary of the operation of the projector.

An example of the operation of the projector 2 according to the present embodiment will be described below with reference to FIG. 8. The circuit apparatus 80 first externally acquires distance image data under the control of the main controller 88 (step S11). The distance image data is image data containing stereoscopic information and contains distance zone information and image information. The distance zone information contains a plurality of distance zones that correspond to or belong to ranges obtained by dividing the projection distance from the projector 2 into a plurality of stepwise segments, and the image information contains image data to be displayed in each of the distance zones. Specifically, each of the distance zones is similar to the area between a pair of contours adjacent to each other, and the image data specifies an image to be displayed in the area between the pair of contours adjacent to each other on a distance zone basis (see image source areas AS11 to AS14, image ranges G11 to G14, and other portions in FIG. 5(C) as specific example). That is, image data to be projected in a plurality of focus positions represented by the distance zones are provided in advance.

The main controller 88 then sets a projection distance zone based on the distance image data (step S12). That is, the main controller 88 selects a distance zone involved in the current projection from the plurality of distance zones described above and sets the selected distance zone as the projection distance zone.

The main controller 88 then selects image information or image data corresponding to the projection distance zone obtained in step S12 as an image to be displayed (step S13).

Thereafter, in each of the liquid crystal panels 21a, an image source area AS in which an image is displayed (see FIGS. 2(A), 3(B), and 4(B), for example) is set (step S14). The image source area AS is calculated by the image processor 81 and other components based on the projection distance zone obtained in step S12.

Thereafter, for each of the image source areas AS calculated in step S14, the image processor 81 corrects the image data selected in step S13 (step S15). The reason for this is that correction of an image to be formed in each of the image source areas AS based on the degree of deviation of the liquid crystal panel 21a from the optical axis OA allows image light rays IM to be precisely superimposed on one another, whereby a sharp small image G1 can be produced, as described with reference to FIGS. 7(A) and 7(B).

The image processor 81 then outputs the corrected image signal to the display driver 82 (step S16). The display driver 82 drives each of the liquid crystal panels 21a, which form the display device 20, to cause the liquid crystal panel 21a to display an image corresponding to the image signal inputted from the image processor 81.

The main controller 88 then evaluates whether or not there is any left distance zone to be involved in the following projection among the plurality of distance zones obtained in step S11 (step S17). When there is a left distance zone to be involved in the following projection, the control returns to step S12, where a distance zone to be involved in the current projection after the update is selected.

When no distance zone is left in step S17, it is evaluated whether or not there is a next frame (step S18). No left distance zone means that one image has been completely projected. That is, repeating steps S12 to S17 allows projection of images in a time division manner in the entire projection distance zones, which form a three-dimensional range. On the other hand, when the result of the evaluation in step S18 shows that a next frame is present, the control returns to step S11, where distance image data corresponding to the next frame is acquired.

When frames change in a time series manner and they change at high speed, motion images are displayed in the image source areas AS, whereby stereoscopic motion images are projected on the surface of a stereoscopic projection receiving object.

In the processes described above, it is assumed that the distance and orientation from the projector 2 to a projection receiving object are known, and that the shape of the projection receiving object is also known. The same projection can, however, be performed even when the distance and orientation to a projection receiving object are unknown. In this case, providing the projector 2 with a distance measurement apparatus and an image recognition apparatus and measuring the distance and orientation from the projector 2 to a projection receiving object allow the same projection operation shown in FIG. 8. Further, even when the shape of a projection receiving object is unknown or changes, measuring or otherwise identifying the shape of the projection receiving object allows the same projection. In this case, distance image data is partially prepared or processed in the projector 2.

According to the projector 2 of the present embodiment described above, the projection optical system 40 projects a superimposed image from the superimposing optical system 30, and the display controller 80a changes the position where image light rays IM are superimposed on one another to a plurality of superimposition positions different from one another along the optical axis OA, whereby simultaneous or concurrent projection in spaces having different depth ranges can be performed.

Second Embodiment

A projector according to a second embodiment will be described below. The projector according to the second embodiment is a deformed version of the projector according to the first embodiment, and portions that will not be particularly described below have the same structures as those in the projector according to the first embodiment.

Figure 9:
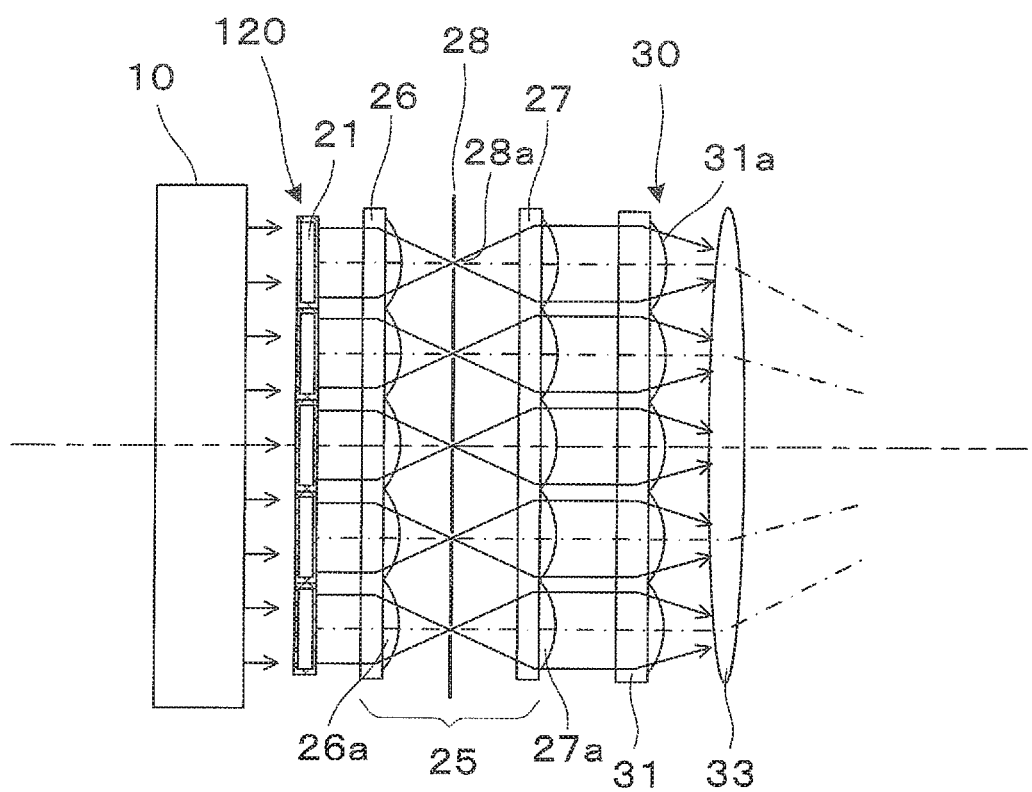
FIG. 9 is a view for describing a projector according to a second embodiment.

The projector 2 according to the second embodiment is provided with a parallelized light selection section (light ray selection section) 25 in a display device 120, as shown in FIG. 9. The parallelized light selection section 25 has a pair of lens arrays 26 and 27, which have the same structure as that of the lens array 31 in the superimposing optical system 30 and are disposed to be concentric with each other, and a pinhole array 28, which is aligned with the lens arrays 26 and 27 and disposed therebetween. Image light rays having exited out of the display sections 21 pass through lens elements 26a of the lens array 26, which cause the image light rays to converge, and the convergent image light rays pass through pinholes 28a of the pinhole array 28, which are located on the divided optical axes. The image light rays then pass through lens elements 27a of the lens array 27, which parallelize, that is, collimate the image light rays, and the parallelized or collimated image light rays are incident on the lens elements 31a of the lens array 31. Providing the parallelized light selection section 25 allows removal of unnecessary light resulting from diffracted light or other types of undesired light produced by the liquid crystal panels 21a.

The light source used as the illuminator 10 is not limited to a surface-emitting laser, and the illuminator 10 can be formed, for example, of a lamp, a mirror, and a collimator lens.

Third Embodiment

A projector according to a third embodiment will be described below. The projector according to the third embodiment is a deformed version of the projector according to the first embodiment, and portions that will not be particularly described below have the same structures as those in the projector according to the first embodiment.

Figure 10:
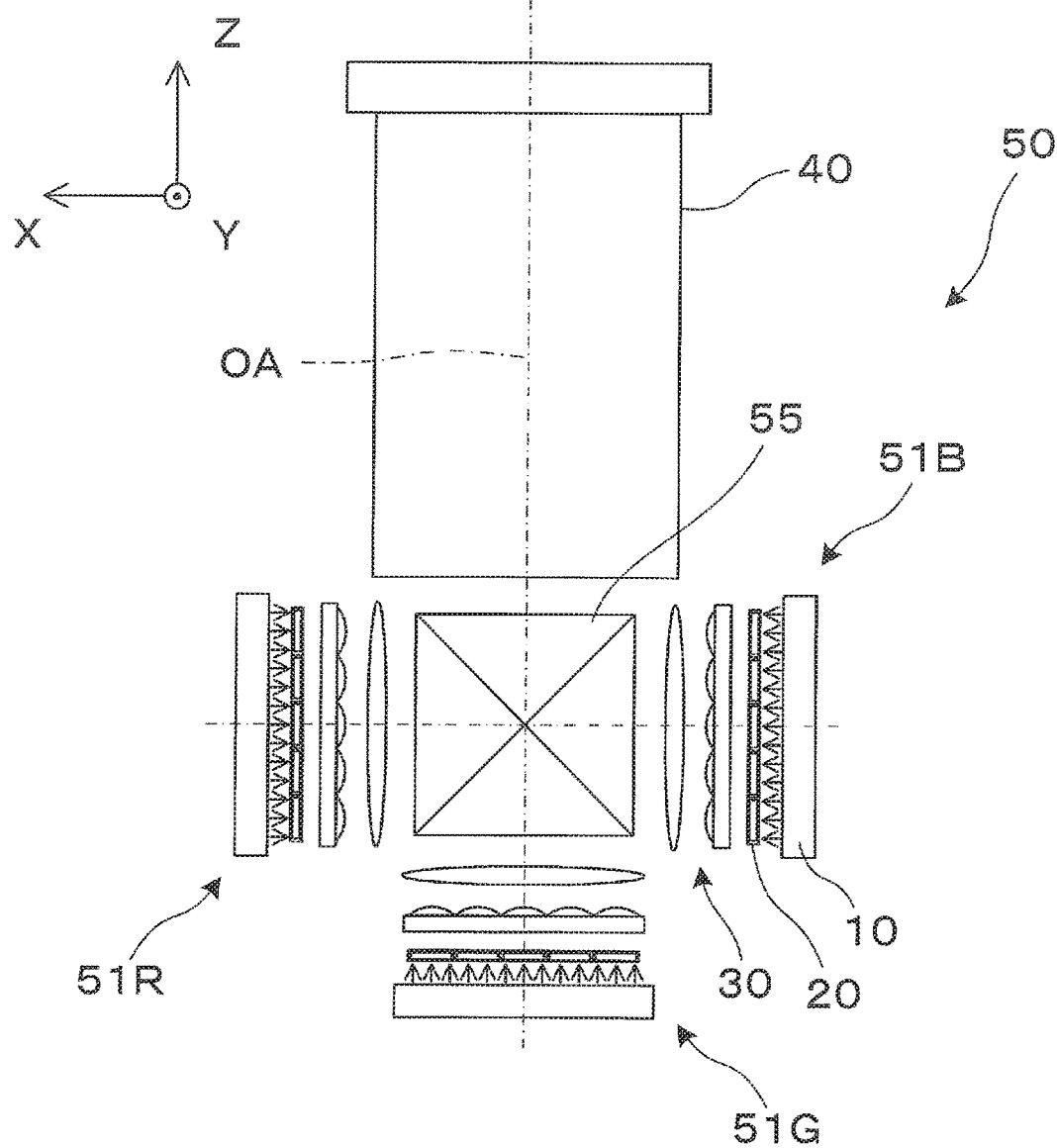
FIG. 10 is a view for describing a projector according to a third embodiment.

In the projector 2 according to the third embodiment, the optical system unit 50 includes image formation sections 51R, 51G, and 51B for red, green, and blue components, and a cross dichroic prism 55, and the projection optical system 40, as shown in FIG. 10.

The image formation sections 51R, 51G, and 51B for the color components have the same function as that of the illuminator 10, the display device 20, and the superimposing optical system 30 shown in FIG. 1 but include illuminators 10, display devices 20, and superimposing optical systems 30 that provide different display colors.

The cross dichroic prism 55 is a light combining prism and combines image light rays formed by the image formation sections 51R, 51G, and 51B to form image light and causes the image light to be incident on the projection optical system 40.

The projection optical system 40 can enlarge and project the image light that is a combination of the image light rays modulated by the image formation sections 51R, 51G, and 51B and combined with one another by the cross dichroic prism 55 on a stereoscopic object that is not shown.

The invention is not limited to the embodiments described above or examples thereof and can be implemented in a variety of aspects to the extent that they do not depart from the substance of the invention.

Figure 11:
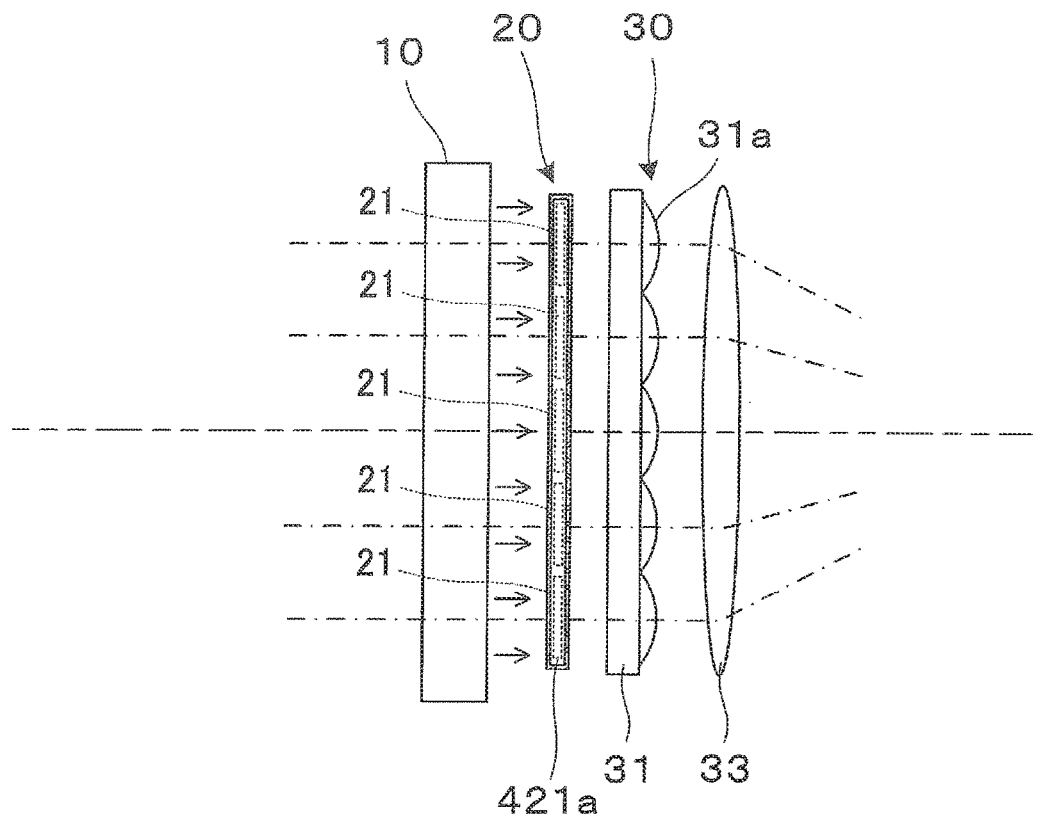
FIG. 11 is a view for describing a projector (panel) according to a variation.

For example, the display device 20 can instead be formed of a single liquid crystal panel 421a, as shown in FIG. 11. In this case, a large number of two-dimensionally arranged display sections 21 are provided in the liquid crystal panel 421a.

The contour of each of the display sections 21 in the display device 20 and the method for arranging the display sections 21 are not limited to a rectangular or square shape or the method for arranging the rectangular or square areas in a matrix and can be changed in a variety of manners. The display sections 21 can be arranged, for example, in a triangular lattice point pattern, a hexagonal lattice point pattern, or any other lattice point pattern, and the contour of each of the display sections 21 can instead be a polygon, circle, or any other shape. In this case, light blocking frames 21b are arranged in correspondence with the arrangement of the display sections 21.

Further, the display sections 21 are not necessarily arranged in a closely packed manner and can instead be disposed at arbitrary two-dimensional points. In this case as well, the light blocking frames 21b are arranged in correspondence with the arrangement of the display sections 21.

It can be said that the display sections 21, which form the display device 20, allow projection based on superimposition of light fluxes from at least two display sections 21. However, from a viewpoint of projection of a bright image, the display sections 21 are desirably arranged, for example, in a matrix of 5 rows and 5 columns or a larger number of rows and columns.

Further, the display elements provided in the display device 20 are not limited to the transmissive liquid crystal panels 21a and can instead be reflective liquid crystal panels. In this case, the reflective liquid crystal panels in a single row are illuminated together, and the reflective liquid crystal panels illuminated on a row basis are arranged in a plurality of rows to achieve a two-dimensional arrangement of the reflective liquid crystal panels.

Further, each of the display elements provided in the display device 20 can instead be a digital micromirror device that uses a micromirror as a pixel or any of a variety of other types of light modulation device.

Moreover, the projection optical system 40 may instead be a zoom lens. In this case, reduction projection can be performed, and a variable depth of field can be achieved. Adjusting the depth of field of the projection optical system 40 allows the display range in the depth direction to be widened. Further, a variable focused state of the projection optical system 40 allows the three-dimensional projection space provided by the projector 2 to be shifted along the optical axis OA.

REFERENCE SIGNS LIST

2: projector
10: illuminator
10a: output surface
20: display device
21: display section
21a: liquid crystal panel
21b: light blocking frame
25: parallelized light selection section
26,26: lens array
28: pinhole array
30: superimposing optical system
31: lens array
31a: lens element
33: superimposing lens
40: projection optical system
50: optical system unit
51R, 51G, 51B: image formation section
55: cross dichroic prism
80: circuit apparatus
80a: display controller
81: image processor
82: display driver
88: main controller
AR11 to AR 14: area
AS: image source area
AS11 to AS14: image source area
FC': projection rear focal plane
FC: projection front focal plane
G1: small image
G11 to G14: image range
IM: image light ray
IM0, IM1, IM2: image light ray
IP0: specific point
IP3: intersection
IP4: off-axis point
LI: illumination light
OA: optical axis
OA1: divided optical axis
PC: conjugate position
PO: projection receiving object

The invention claimed is:
1. A projector comprising:
a plurality of display sections each of which forms a collimated image light ray;
a superimposing optical system that superimposes the image light rays having exited out of the plurality of display sections on one another with the image light rays unfocused to a single location;
a projection optical system that projects an image corresponding to the image light rays superimposed by the superimposing optical system; and
a display controller that causes the image light rays to exit out of local image source areas set in the plurality of display sections to shift a position where the image light rays are superimposed on one another to a plurality of superimposition positions different from one another along an optical axis.

2. The projector according to claim 1,
wherein the superimposing optical system includes a plurality of lens elements facing the plurality of display sections and a superimposing lens that superimposes the image light rays having passed through the plurality of lens elements on one another in such a way that the image light rays are concentrated.

3. The projector according to claim 1,
wherein in each of the display sections, the center of the image source area is set in a position shifted from a standard position that is a reference in accordance with a relative arrangement of the display section and the setting of the superimposition position.

4. The projector according to claim 3,
wherein in each of the display sections, the amount of shift of the center of the image source area from the standard position is roughly proportional to the distance from a center through which the optical axis of the superimposing optical system passes to the center of the display section.

5. The projector according to claim 4,
wherein a plurality of images to be displayed in the plurality of display sections are each a basic image deformed in accordance with the deviation from the center.

6. The projector according to claim 3,
wherein in each of the display sections, when the center of the image source area coincides with the standard position, the superimposition position is conjugate with the display section with respect to the superimposing optical system.

7. The projector according to claim 1,
wherein the plurality of display sections correspond to a plurality of portions formed in a single display element or a plurality of display elements.

8. The projector according to claim 1,
wherein the plurality of display sections have transmissive display elements and an illuminator that illuminates the display elements.

9. The projector according to claim 8,
wherein the illuminator includes a surface-emitting laser.

10. The projector according to claim 1,
wherein the plurality of display sections have a light ray selection section that includes a pair of lens arrays and a pinhole array sandwiched therebetween and selectively transmit image light rays parallelized by the light ray selection section.

11. The projector according to claim 1,
wherein the display controller changes the superimposition position in a time division manner to allow the projection optical system to perform projection in projection positions over a three-dimensional range.

12. The projector according to claim 1,
wherein the display controller causes the plurality of display sections to display motion images in the image source areas.

\* \* \* \* \*